US009250043B1

(12) United States Patent
Block et al.

(10) Patent No.: US 9,250,043 B1
(45) Date of Patent: Feb. 2, 2016

(54) SYSTEM AND METHOD FOR EARLY INTERCEPT BALLISTIC MISSILE DEFENSE

(75) Inventors: Allen W. Block, Cherry Hill, NJ (US); Jeffrey B. Boka, Lumberton, NJ (US); Walter R. Cottee, Delran, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 771 days.

(21) Appl. No.: 13/584,138

(22) Filed: Aug. 13, 2012

(51) Int. Cl.
*F41G 7/30* (2006.01)
*F41H 11/02* (2006.01)
*B64G 1/52* (2006.01)
*F41H 7/00* (2006.01)
*B63G 9/00* (2006.01)
*B64D 7/00* (2006.01)
*F41G 7/00* (2006.01)
*F41H 11/00* (2006.01)

(52) U.S. Cl.
CPC *F41H 11/02* (2013.01); *B63G 9/00* (2013.01); *B64D 7/00* (2013.01); *B64G 1/52* (2013.01); *F41G 7/30* (2013.01); *F41G 7/301* (2013.01); *F41G 7/303* (2013.01); *F41G 7/306* (2013.01); *F41H 7/005* (2013.01)

(58) Field of Classification Search
CPC .............. B63G 9/00; B64D 7/00; B64G 1/22; B64G 1/52; F41H 7/005; F41H 11/00; F41H 11/02; F41G 7/20; F41G 7/30; F41G 7/301; F41G 7/303; F41G 7/306; F41G 7/308; F42B 15/01; F42B 15/10
USPC ............. 244/3.1–3.3; 89/1.11; 342/61, 62, 13
See application file for complete search history.

(56) References Cited

U.S. PATENT DOCUMENTS

| 4,925,129 | A | * | 5/1990 | Salkeld | F41G 7/30 244/3.11 |
|---|---|---|---|---|---|
| 5,458,041 | A | * | 10/1995 | Sun | F41G 7/308 244/3.11 |
| 5,811,788 | A | * | 9/1998 | Wicke | F41G 7/306 244/3.1 |
| 6,527,222 | B1 | * | 3/2003 | Redano | 244/3.14 |
| 6,666,401 | B1 | * | 12/2003 | Mardirossian | 244/3.11 |
| 6,990,885 | B2 | | 1/2006 | Boyd | |
| 7,026,980 | B1 | | 4/2006 | Mavroudakis et al. | |
| 7,181,323 | B1 | | 2/2007 | Boka et al. | |
| 7,295,149 | B1 | | 11/2007 | Wolf | |
| 7,394,047 | B1 | | 7/2008 | Pedersen | |
| 7,411,543 | B1 | | 8/2008 | Boka | |
| 7,473,876 | B1 | | 1/2009 | Pedersen et al. | |
| 7,511,252 | B1 | | 3/2009 | Pedersen et al. | |
| 7,552,669 | B1 | | 6/2009 | Denis et al. | |
| 7,626,534 | B1 | | 12/2009 | Boka et al. | |

(Continued)

*Primary Examiner* — Bernarr Gregory
(74) *Attorney, Agent, or Firm* — Howard IP Law Group, PC

(57) ABSTRACT

A system and method for tracking and engaging a boosting airborne object comprises a plurality of sensors, a first vehicle, and a second vehicle. The plurality of sensors are configured to detect and track the boosting airborne object. The first vehicle is configured to launch and guide an intercept object based on data it receives from the plurality of sensors. A second vehicle is configured to receive a cue from the first vehicle to acquire track of the airborne object and then provide track data to the first vehicle even after burnout, thereby enabling the first vehicle to provide midcourse guidance to the intercept object. The first vehicle may be positioned farther from a launch point of the airborne object than the second vehicle, thereby providing the first vehicle an increased engagement time and the second vehicle a better position to acquire track of the boosting airborne object.

21 Claims, 3 Drawing Sheets

(56) References Cited

U.S. PATENT DOCUMENTS

| | | |
|---|---|---|
| 7,663,528 B1 | 2/2010 | Malakian et al. |
| 7,875,837 B1 * | 1/2011 | Szabo et al. ............ 244/3.15 |
| 7,886,646 B2 | 2/2011 | Bannasch et al. |
| 7,977,614 B2 * | 7/2011 | Raviv ...................... 244/3.11 |
| 8,098,183 B1 * | 1/2012 | Pedersen ................. 342/13 |
| 8,106,340 B1 | 1/2012 | Diaz et al. |
| 8,130,137 B1 | 3/2012 | Luu et al. |
| 8,134,103 B2 * | 3/2012 | Luu et al. ................ 244/3.1 |
| 8,138,965 B1 | 3/2012 | Luu et al. |
| 8,288,696 B1 * | 10/2012 | Boka et al. .............. 244/3.11 |
| 8,378,880 B1 * | 2/2013 | Boka et al. .............. 244/3.15 |
| 8,710,411 B1 * | 4/2014 | Lapat ...................... 244/3.15 |
| 2006/0238403 A1 * | 10/2006 | Golan et al. ............ 342/62 |

* cited by examiner

SYSTEM AND METHOD FOR EARLY INTERCEPT BALLISTIC MISSILE DEFENSE

FIELD OF THE INVENTION

This invention relates to a system and method for early intercept ballistic missile defense, particularly missile defense during and after boost phase but before apogee.

BACKGROUND

Defense against missile attack has been important for centuries. In the distant past, fortified structures were used to protect against missiles such as projectiles from catapults. With the advent of projectile-firing cannon, fortified structures became less useful, and the inadequacy of fortifications was exacerbated by the introduction of bomb-carrying aircraft.

More recently, rocket-propelled missiles have become very important, because of their ability to quickly transport extremely destructive payloads to distant locations. The payloads that are now of importance include nuclear, chemical, and biological weapons, known generally as weapons of mass destruction (WMD). These payloads when carried by rocket-propelled missiles are potentially so destructive that a great deal of attention has been directed toward attempts to neutralize the threat.

As a response to the perceived threat to the Unites States of inter-continental ballistic missiles (ICBMs) launched from distant locations and carrying WMD, programs have been instituted to investigate and produce ballistic missile defense systems. Ballistic missiles have an extremely limited time between launch and impact, so defense systems must very quickly identify and destroy the threat.

The ballistic missile goes through several distinct phases during its operation. The first phase is launch, in which a rocket engine lifts the missile and propels it upward. The missile is relatively vulnerable at this stage, but there are substantial difficulties in identifying it at this stage. For example, the launch is liable to be in a hostile territory. Furthermore, while the launch may produce a heat (infrared) and light signature that would be identifiable if viewable, there may not be a line-of-sight between sensors and the missile launch that might identify the situation. Spacecraft may be able to view the region, but the communications between the spacecraft and defense systems tend not to provide long warning times of missile launch. Moreover, sensor systems such as space based sensors which detect heat or light, can only track the missile while those signature characteristics are present and detectable (i.e. during launch and/or boost phases).

Following launch, the rocket-propelled missile passes through a boost stage, in which the rocket engine propels the missile through a principal portion of the atmosphere. This phase also produces a heat signature. Since the missile is at a significant altitude in this phase, it may be observable by land-based, air-based, or space-based infrared sensors. The missile may also be observable on land-based radar systems. Thus, a missile may be identifiable when in its boost phase. At some time, the rocket engine stops operating, so boost thrust goes to zero. Following the termination of thrust, the missile enters a mid-course phase, in which the missile proceeds along a ballistic trajectory to its apogee, carried by its own inertia. The missile in its ballistic mode proceeds toward its target. In the mid-course phase, the heat signature is much reduced. Therefore, infrared sensors become less effective; however, the missile may be clearly viewed by radar.

At some point after the apogee of the missile's path, as the missile approaches its target, it begins to re-enter dense portions of the atmosphere. This re-entry may be at a location essentially above the target. Destruction of the missile during the re-entry phase may still result in damage to the target, since the payload weapon may still be effective and active. Despite the missile being damaged and kept from properly functioning, the constituent parts may still be very harmful to the target region.

Thus, it is desirable to identify and destroy missiles early in flight, to allow time for repeated tries at destruction and so that the destroyed missile falls short of its target, preferably in the hostile territory. In particular, early intercept (EI), which is a launch of a countermeasure during the threat's boost phase with intercept occurring after burnout but before the threat reaches its apogee, provides for increased forward engagement battlespace with potential shoot-look-shoot (SLS) opportunities. Early intercept also allows for interception of the threat before it deploys its payload and before the threat is able to deploy a countermeasure package.

Existing solutions for early intercept consist of a single ship identifying a threat such as a missile, tracking the threat with its local radar, and then engaging the threat. This single ship solution relies entirely on local radar and is not able to provide effective early intercept performance for intermediate or longer range threats.

A single ship solution that is supplemented by offboard Electro-Optical/Infra red track reports (such as from an Overhead Persistent Infrared (OPIR) sensor, an overhead non-imaging infrared (ONIR) sensor, or even land-based sensors) to provide initial threat detection has also been considered. But while the supplemental sensors can provide earlier threat detection capability relative to shipboard radar alone, these supplemental sensors have little or no tracking capability after threat burnout because the threat's heat signal dissipates rapidly after burnout. Thus, while a single ship solution using supplemental sensors could launch a countermeasure based on the data from the supplemental sensors before acquisition of the threat by the ship's local radar, the ship's local radar must pick up the threat after launch to close the fire control loop so that the countermeasure can be guided to intercept the threat.

Placement of the ship when using a single ship solution supplemented by sensors is problematic because there is no optimal single ship placement for both threat acquisition and missile intercept. While it is advantageous to be as close as possible to the threat for timely detection, the relative missile/threat geometries resulting from a closer ship placement results in tail chase engagements where the anti-missile weapons (e.g. RIM-161 Standard Missile 3 (SM-3)) must "catch up" with the threat, resulting in limited engagement opportunities. When the ship is placed farther away from the launch point of the ballistic threat to provide better intercept geometry, the ship's radar is also farther away which results in a limited detection capability to detect the threat prior to burnout when the supplemental sensors cease to provide data.

Alternative early intercept missile tracking systems and methods are desired.

SUMMARY

According to an aspect of the disclosure, a dual vehicle early intercept solution is provided that satisfies both detection and intercept performance requirements for early intercept. The dual vehicle solution includes placement of one sensing vehicle sufficiently close to the threat launch point, which maximizes the likelihood of timely detection and enables the sensing vehicle to achieve threat acquisition prior to threat burnout, and a second "shooter" vehicle farther down range relative to the threat launch point, that improves early intercept geometries, reduces tail chase engagements, and improves early intercept opportunities. The two vehicles are capable of data transmission between vehicles using known methods.

A system for tracking and engaging a boosting airborne object is disclosed. The system comprises a plurality of sensors, a first vehicle, and a second vehicle. The plurality of sensors are configured to detect and track the boosting airborne object during launch and boost phases of the object. The detection and tracking of the sensors may be by way of heat signature detection of the airborne object during its boost phase. The first vehicle is configured to receive data transmitted from the plurality of sensors and launch and guide an intercept object based on data relating to the boosting airborne object received from the plurality of sensors. Data from the sensors enables boost phase algorithms on the first vehicle to identify the boosting target, develop a launch solution, and generate an engageability solution using for example, an IR model and launch of an intercept missile for a predicted intercept point using the IR data to derive parametric information such as position, velocity and acceleration, while the object is still in boost phase. The second vehicle is configured to receive a cue from the first vehicle to acquire the track of the airborne object prior to the end of boost and upon acquisition, provide track data to the first vehicle after airborne object burnout, thereby enabling the first vehicle to guide the intercept object according to the provided track data from the second vehicle.

The first vehicle may be located farther from a launch point of the boosting airborne object than the second vehicle, thereby providing the first vehicle an increased engagement time to engage the boosting airborne object and placing the second vehicle in position for its radar to acquire track of the boosting airborne object. The plurality of sensors may be configured to detect and track a heat signature of the boosting object and the plurality of sensors may comprise overhead persistent infrared sensors. In another embodiment, the plurality of sensors are configured to detect and track a light signature of the boosting object, and the plurality of sensors comprise electro-optical sensors. One of the plurality of sensors may be space-based, or one of the plurality of sensors may be land-based. The first vehicle and second vehicle may be ships. In one embodiment, the first vehicle may be land-based or air-based or the second vehicle may be land-based or air-based.

A method for tracking and intercepting an airborne object is disclosed. The method comprises the steps of: detecting and tracking the airborne object in boost by a plurality of sensors; receiving data from the plurality of sensors for the airborne object in boost at a first vehicle; employing algorithms to identify the boosting object and compute launch solution; launching an intercept object from the first vehicle based on the data; receiving at a second vehicle a tracking cue for the airborne object; employing boost phase algorithms to acquire track of the airborne object by the second vehicle based on the tracking cue; tracking the airborne object after burnout by the second vehicle; sending tracking data for the airborne object after burnout from the second vehicle to the first vehicle; and guiding the intercept object to intercept the airborne object by the first vehicle based on the tracking data received from the second vehicle.

The method may further comprise positioning the first vehicle farther from a launch point of the airborne object than the second vehicle, thereby providing the first vehicle an increased engagement time to engage the airborne object and thereby placing the second vehicle in position for its radar to track the airborne object. Detecting and tracking an airborne object by a plurality of sensors may comprise detecting and tracking a heat signature of the airborne object, and receiving data from the plurality of sensors for the airborne object at a first vehicle may comprise receiving overhead persistent infrared sensor data. In another embodiment, detecting and tracking an airborne object by a plurality of sensors may comprise detecting and tracking a light signature of the airborne object, and receiving data from the plurality of sensors for the airborne object at a first vehicle may comprise receiving electro-optical sensor data.

The method may further comprise processing the data from the plurality of sensors with a first vehicle track solution to obtain first vehicle track solution data for the airborne object. The method may also further comprise, before launching the intercept object, generating a fire control solution at the first vehicle, based on the first vehicle identification and track solution data which includes predicted acceleration data, for launching the intercept object so that it intercepts the airborne object before apogee.

In an embodiment, a method comprises receiving at the second vehicle a tracking cue for the airborne object that may include receiving the first vehicle track solution data from the first vehicle. In another embodiment, receiving at the second vehicle a tracking cue for the airborne object may comprise receiving the data from the plurality of sensors for the airborne object. Tracking the airborne object by the second vehicle may comprise tracking the airborne object with a local radar on the second vehicle and processing data from the local radar with a second vehicle tracking solution including boost phase algorithms to obtain second vehicle tracking solution data while the object is still boosting. Sending tracking data for the airborne object from the second vehicle to the first vehicle may comprise sending the second vehicle tracking solution data from the second vehicle to the first vehicle. The second vehicle tracking solution data may comprise position, velocity, discrimination, and designation information. Guiding the intercept object to intercept the airborne object by the first vehicle based on the tracking data received from the second vehicle may comprise guiding the intercept object by the first vehicle based on the second vehicle tracking solution data.

DETAILED DESCRIPTION

Figure 1:
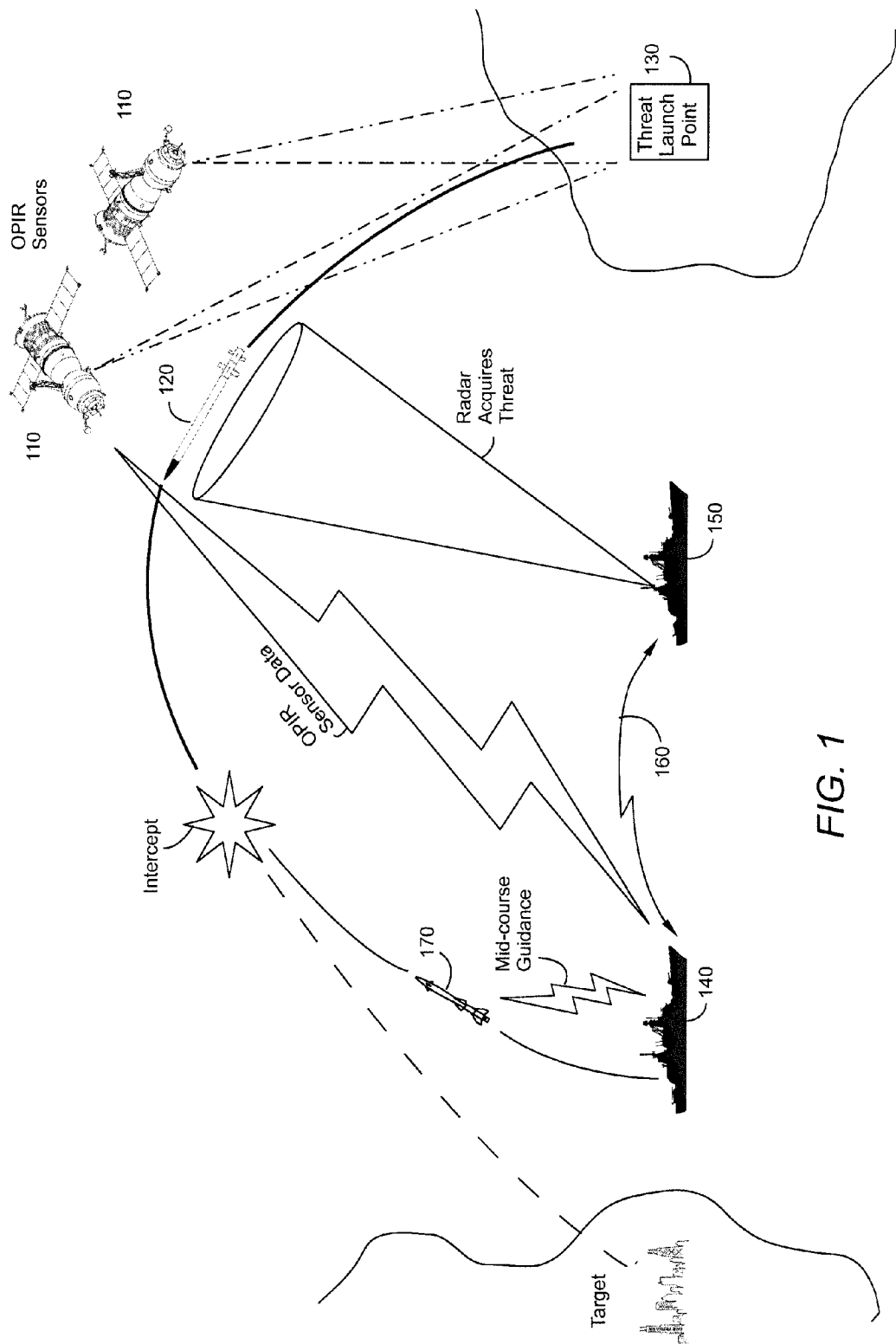
FIG. 1 is a simplified diagram illustrating a system for tracking and intercepting a ballistic threat according to an aspect of the disclosure.

FIG. 1 is a simplified diagram illustrating a system for detecting, tracking, and intercepting a ballistic threat according to an aspect of the disclosure. A plurality of sensors 110 monitor an area and are capable of detecting the launch of a ballistic threat 120 such as an ICBM from a launching location 130. In an embodiment, the sensors 110 are electro-optical or infrared sensors that are able to sense the boost phase of the threat. Overhead Persistent Infrared sensors (OPIR) on satellites (also known as Overhead Non-Imaging Infrared sensors (ONIR)) are one type of sensor that may be used. In some geographic areas, it may be possible to position land-based sensors or even sky-based sensors so that they are able to sense the boost phase of a threat. Whichever type of sensor is used, it is anticipated that sensor measurements from two different sensors are needed to develop a stereo 3-dimensional track state solution for the ballistic threat.

Vehicle 140 and vehicle 150 are also shown on FIG. 1. Vehicle 140 is a "shooting" vehicle with intercept capabilities, meaning it is able to launch and then guide an intercept object that can intercept ballistic threat 120. Intercept objects are known in the art and may include kill vehicles such as missiles and laser beam countermeasures. Vehicle 150 is a "sensor" vehicle that has a radar that is able to track the ballistic threat 120 both during and after boost. An example of such a radar is the AN/SPY-1 radar used in U.S. naval vehicles as part of the AEGIS Combat System. Vehicles 140 and 150 may be sea-based ships as shown. In another embodiment both vehicles may be ground-based or sky-based or a combination of all of the foregoing, as long as vehicle 140 has intercept capabilities and vehicle 150 has radar capabilities. An example of a land-based vehicle is the planned AEGIS ASHORE land-based anti-ballistic system, which adapts the anti-ballistic technology used on ships to land-based vehicles. In another embodiment, the vehicles can be sky-based. Notably, while use of the term "vehicle" may describe elements that are mobile such as ships and movable ground-launchers, the term is also intended to encompass non-movable elements such as permanent or semi-permanent structures that contain intercept and/or radar capabilities as described herein.

Figure 3:
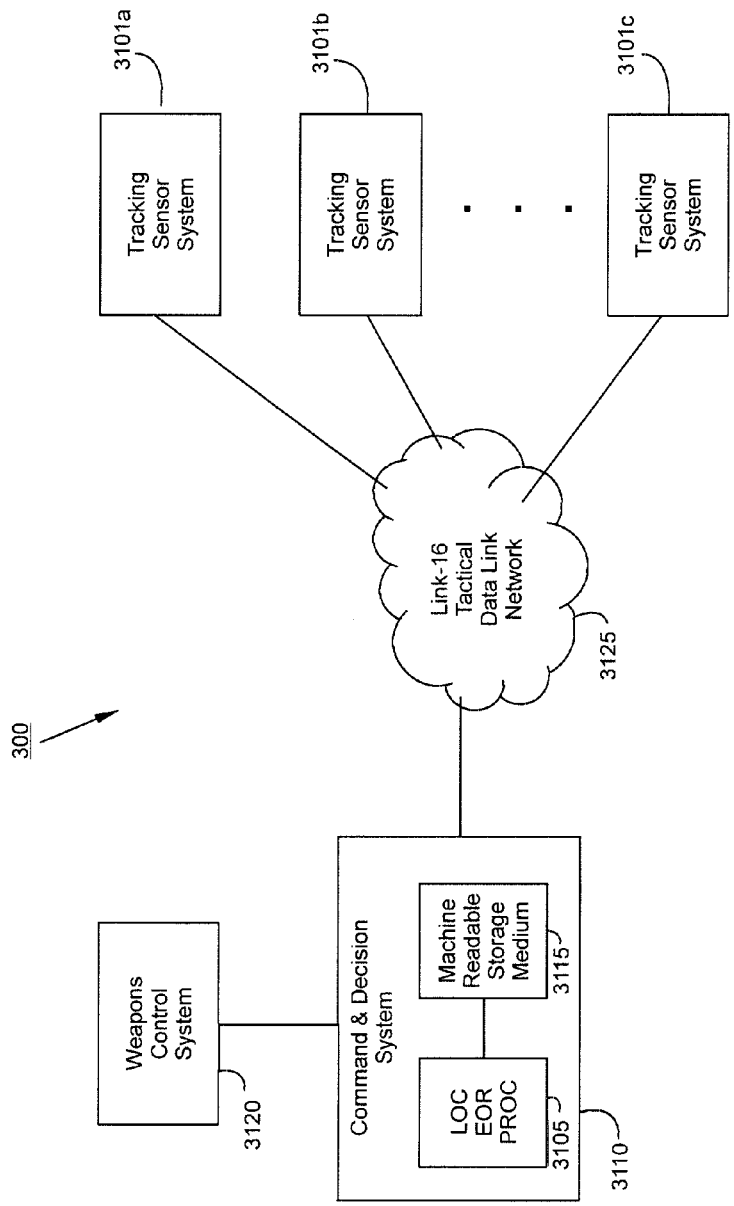
FIG. 3 is a simplified block diagram of a system configured to receive sensor data and execute launch on remote (LOR) and engage on remote (EOR) functionality according to an aspect of the disclosure.

By way of example only, a system block diagram 300 of vehicle 140 (FIG. 1) having appropriate radar, tracking, and launch capabilities is shown schematically in FIG. 3. It is noted that vehicle 150 may be similarly configured, although fire control and launch command control systems are not required for the cued vehicle 150. As illustrated, an embodiment of a system 300 in which the disclosed computer-implemented launch on remote (LOR) and engage on remote (EOR) processing and operations are performed using sensor track data in a Link 16 network is provided. The system 300 embodied in vehicle 140 includes one or more target tracking/receiving sensor systems such as subsystems 3101a, 3101b, 3101c, a processing subsystem such as a computer subsystem 3110, and a Link 16 network 3105 connecting the computer subsystem 110 to the one or more target tracking subsystems 101a, 101b, 101c. The target tracking subsystems track and monitor ballistic targets and provides sensor track data containing the target track data on the airborne target(s) to the computer subsystem 3110 via the data link network 3125. A weapons control system 3120 is also linked to the computer subsystem 3110. The computer subsystem 3110 provides the commands and target information to the weapons control system 3120 for taking actions against the target such as launch of an interceptor missile. The system further includes machine-readable storage medium 3115 associated with the computer subsystem 3110. The machine-readable storage medium is encoded with computer program code, such that, when the computer program is executed by a processor, such as one or more of computer processor 3105 of computer subsystem 3110, the processor performs the method for executing the launch on remote (LOR), including receipt and processing of OPIR sensor data to execute launch of an interceptor, boost filter processing and obtaining track data, including pseudo-ballistic target track state data at projected boost/ballistic transition time, for transmission of cue data output from the vehicle (i.e. vehicle 140) over the Link 16 interface. The processor further performs engage on remote (EOR) processing of remote data received via the Link 16 interface including remotely received updated ballistic estimates of the target states (position and velocity), for uplink to the interceptor, to provide closed loop guidance and midcourse guidance commands to the interceptor missile during the endo- and exo-atmospheric portions of the interceptor missile's flight. Such machine-readable storage medium 3115 can be a single data storage unit or a storage system comprising multiple data storage units that are connected to the computer subsystem 3110. Such machine-readable storage medium 3115 can include magnetic, optical or solid-state storage media, or a combination thereof. The machine-readable storage medium 3115 can also include portable machine-readable storage devices such as a random access memory device, a read only memory device, a magnetic medium such as a hard-drive or a floppy disk, or an optical medium such as a Compact Disc, a DVD, etc. that are loaded on to the computer subsystem 3110 to allow the command and decision system to access the computer program code encoded thereon.

In an embodiment, vehicles 140 and 150 are deployed in favorable geometries for their respective functions. Thus, vehicle 140 is deployed farther from the ballistic threat (e.g. "far ship") so that it has better intercept geometries that enable it to achieve fire control engagement sufficient to launch the intercept object 170. Vehicle 150 is deployed to be closer to the launch location of the ballistic threat 120 (e.g. "near ship") so that it is able to track the ballistic threat after threat burnout, at which point the plurality of sensors 110 are no longer able to track the ballistic threat. Notably, because the two vehicle solution of the present disclosure launches based on sensor data such as OPIR data rather than on data from a vehicle's local radar, vehicle 150 may be deployed farther from the threat launch point 130 than a vehicle deployed in a single vehicle solution. Accordingly, in an embodiment where vehicle 150 is a ship, it may be possible to deploy vehicle 150 beyond the range of land-based anti-ship weapons. The communication links between and among the a) OPIR sensors; b) vehicle 140; and c) vehicle 150 could include any form of real or near-real-time communication between and among these assets. Communication links are shown directly between assets to illustrate that information is conveyed from one asset to another, however communications do not have to be directly between assets but could use intermediary ground, air, or space-based assets. In one embodiment, the communications from the OPIR sensors to vehicles 140 and 150 are broadcast streams while the data stream 160 between vehicle 150 and vehicle 140 for providing the track data to communicate and complete the intercept is link-16, or S-TADIL J, a real-time Beyond Line-of-Sight (BLOS) Tactical Digital Information Link (TADIL).

Figure 2:
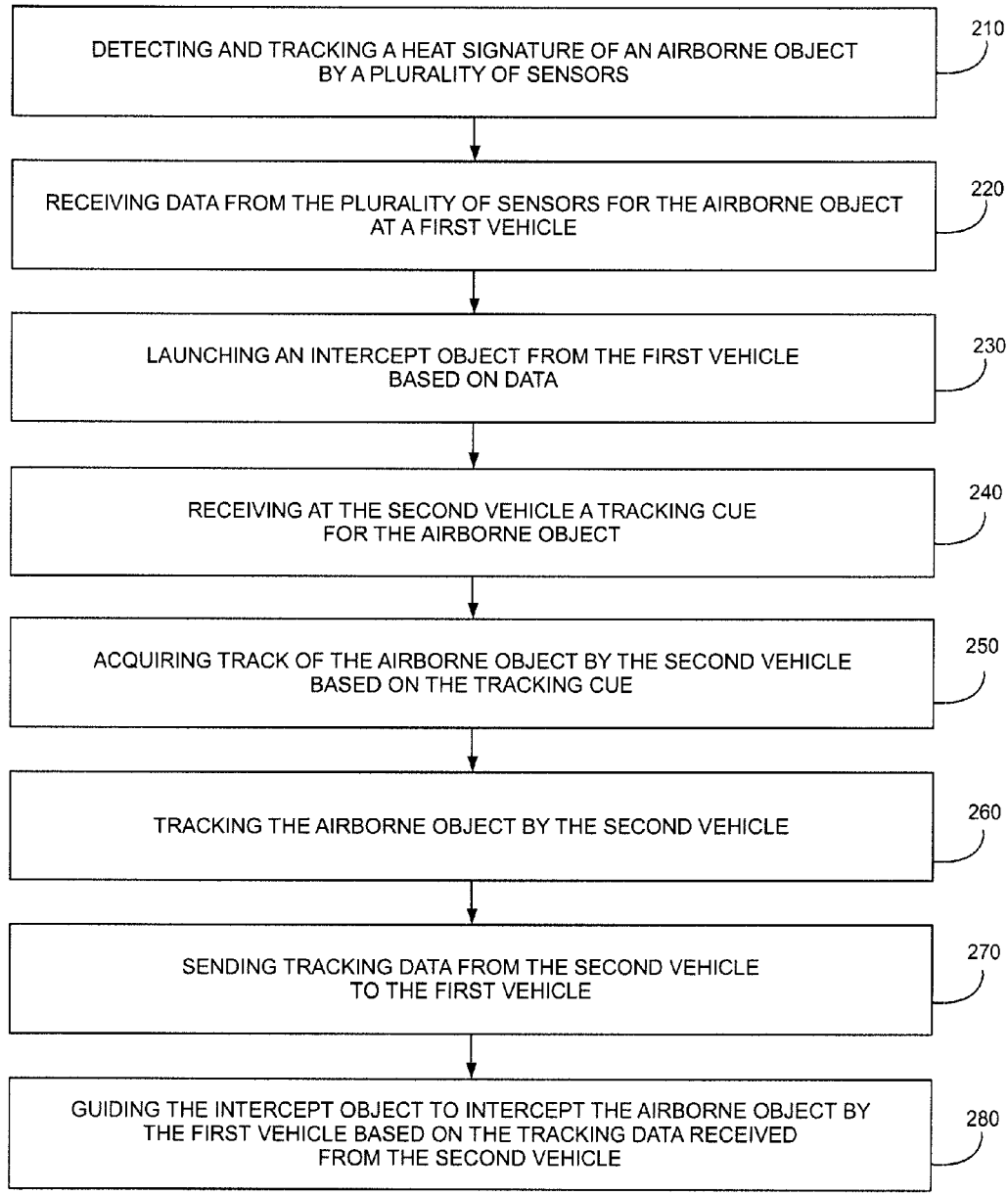
FIG. 2 is a flowchart illustrating steps for tracking and intercepting a ballistic threat according to an aspect of the disclosure.

FIG. 2 is a flowchart illustrating steps for tracking and intercepting a ballistic threat according to an aspect of the disclosure. The steps begin at block 210, which represents detecting and tracking a heat signature of an airborne object by a plurality of sensors 110 (FIG. 1). As noted, the plurality of sensors may be located anywhere (e.g., sky-borne, space-borne, land/sea based) as long as they are capable of detecting and tracking the heat signature of an airborne object after launch and up to (or including) boost. In an embodiment, the plurality of sensors are OPIR space-based sensors. Sensing of a boost phase ballistic missile after launch and tracking of the boost phase missile by the plurality of sensors 110 may be accomplished using mutlihypothesis track filtering, threat type detection, engagement planning and interceptor guidance processing, as shown and described by way of example only, in commonly assigned U.S. Pat. No. 8,106,340, titled "Generalized Midcourse Missile Guidance", the subject matter thereof being fully incorporated by reference herein in its entirety.

Referring to FIG. 2 (in conjunction with FIG. 1) from block 210, the logic flows to block 220, which represents receiving data from the plurality of sensors (e.g. 110 of FIG. 1) for the airborne object at a first vehicle (e.g. 140 of FIG. 1). In an embodiment, the first vehicle is a ship and the data is transmitted from OPIR sensors (e.g. a broadcast stream). The OPIR sensor data includes object acceleration data, and the heat and/or light signatures are used to classify the type of object (e.g. IR modeling). The first vehicle includes computer processors and memory to develop boost phase tracking solutions to track the airborne object based on the data from the OPIR sensors. The solutions are used to estimate current and future states (position/velocity/acceleration) of the airborne object and may also identify the particular type of threat being tracked. Computerized methods for determining the type of a boosting missile may be utilized according to those disclosed in commonly assigned U.S. Pat. No. 8,138,965, titled "Kinematic Algorithm for Rocket Motor Apperception" which is incorporated by reference herein in its entirety. Computerized methods for generating estimates of parameters such as position, velocity and acceleration of a vehicle using vehicle motion and state dynamics and sensor registration bias states may be utilized according to those disclosed in U.S. commonly assigned U.S. Pat. No. 7,181,323, titled "Computerized Method For Generating Low-Bias Estimates Of Position Of A Vehicle From Sensor Data" which is incorporated by reference herein in its entirety. An exemplary tracking solution may be utilized as disclosed in commonly assigned U.S. Pat. No. 7,411,543, titled "Maximum-Likelihood Rocket Identifier," which is also incorporated by reference herein in its entirety. Another exemplary tracking solution may be utilized as disclosed in commonly assigned U.S. Pat. No. 7,026,980, titled "Missile Identification and Tracking System and Method," which is also incorporated by reference herein in its entirety. Still further exemplary tracking and determination solutions are disclosed in commonly assigned U.S. Pat. No. 8,106,340, and commonly assigned U.S. Pat. No. 8,130,137 titled "Template Updated Boost Algorithm", which are also incorporated by reference herein in their entireties.

The logic then flows to block 230, which represents launching an intercept object from the first vehicle based on the data. As noted, the first vehicle uses tracking solutions to track the airborne object using the data from the plurality of sensors. The first vehicle then generates a fire control solution for launching a countermeasure during threat boost so that intercept occurs after threat boost but prior to apogee. Known fire control solutions may be used and modified to achieve intercept after boost but prior to apogee, such as the fire control solution disclosed in commonly assigned U.S. Pat. No. 7,473,876 titled "Boost Phase Intercept Missile Fire Control System Architecture," which is fully incorporated by reference herein in its entirety. Another fire control solution is disclosed in commonly assigned U.S. Pat. No. 7,511,252 titled "Multihypothesis Threat Missile Propagator for Boost-Phase Missile Defense," as well as U.S. Pat. No. 8,106,340, which are also fully incorporated by reference herein in their entireties. The first vehicle then launches an intercept object at the airborne object based on the results of the tracking solution and the fire control solution. In an embodiment in which the first vehicle is a ship such as an Aegis Combat Ship, the intercept object may be one of the Standard Missile family of anti-ballistic missiles that is used to counter ballistic missile threats. Launching based on remote sensor data such as OPIR data provides for an extended engagement timeline as compared to launch based on local radar in a single vehicle solution. It is to be understood that various known fire control solutions may be implemented, including intercept before or after apogee, as current fire control solutions provide for such measures. In any event, and as previously discussed, according to an aspect of the disclosure the launch of an intercept object is based on the OPIR sensor data and processed to generate a fire control solution. However, a midcourse guidance process is necessary in order that the launched object achieve intercept.

The next step at block 240, represents receiving at the second vehicle (e.g. 150 of FIG. 1), a tracking cue for the airborne object. One embodiment of the second vehicle (e.g. 150) is a second ship which has a radar and includes boost phase algorithms that allow it to predict and acquire the track of the airborne object once it receives a tracking cue from the first vehicle (e.g. 140) that tells the second vehicle where to look for the airborne object. This is represented in block 250. In an embodiment, the second vehicle (150 in FIG. 1) receives the tracking cue from the first vehicle (140 in FIG. 1), which is the ship that launched the intercept object 170. In this embodiment, the tracking cue may be information from the tracking solution used by the first vehicle to track the airborne object, which may include information on the current location of the object as well as information on the future states (position/velocity/acceleration) of the airborne object. The cue may also include information directing the radar to look toward a certain volume (search volume). In another embodiment, the tracking cue received by the second ship could simply be the same OPIR sensor data received by the first ship, which the second ship may receive from the first ship or directly from the OPIR sensors in the same way the first vehicle received the data. This may be communicated via Link 16 or other known communications methods (e.g. satellite communications), as is known in the art. This embodiment may result in both the first and second vehicles applying tracking solutions to the data from the OPIR sensors, which could provide desirable redundancy. Cue data provided to the "near" ship 150 from the "launching" or "far" ship 140 would include pseudo-ballistic target track state (position and velocity vectors) valid at projected boost/ballistic transition time obtained from the boost phase filtering algorithms implemented on the "launching" ship. This cue data is expected to be sent over to the "near" ship prior to the end of boost of the target such that the "near" ship can use them to propagate in the time the expected position of the target to a time after the target boost has completed such that the "near" ship can cue its radar to point its beam and acquire the target near the expected boost/ballistic transition location of the target. These states are pseudo-ballistic in the sense that they represent the ballistic propagation states (position and velocity) that can be used to propagate which are valid even during the boost phase of the target.

When the "near" ship 150 receives the cue from the "launching" ship 140, it takes the pseudo-ballistic cue state vector of position and velocity and propagates to the expected boost/ballistic transition time (which is also sent from the "launching" ship as part of the cue data) and has its radar perform a local search around the propagated position at the time of expected boost/ballistic transition. It acquires the target, transitions to track, and starts ballistic filtering the target to obtain a ballistic estimate of the target states (position and velocity), which is then sent back to the "launching" ship as engage on remote (EOR) data to support continued closed loop guidance with the missile. Note that once the "near" ship acquires the target, the standard processing is performed to transition to ballistic tracking of the target. After the track of the airborne object is acquired by the second vehicle 150, tracking of the airborne object by the second vehicle is performed in step 260. As disclosed, the second vehicle is positioned closer to the threat launch location so that it can achieve threat acquisition prior to burnout. The second vehicle may be an Aegis Combat Ship that has a local SPY radar and sufficient computer processors and memory that make it capable of tracking the airborne object using known tracking solutions such as those disclosed in relation to block 220.

The block at step 270 represents sending tracking data from the second vehicle (the "sensing" vehicle) to the first vehicle (the "shooting" vehicle). This tracking data is obtained by the local radar of the second vehicle, which, unlike the first vehicle, is positioned so that its radar is able to track the airborne object even after burnout, which an OPIR or other infrared-based sensor is not able to do. The data is sent from the second vehicle to the first vehicle using known communications systems 160 such link-16, or S-TADIL J, a real-time Beyond Line-of-Sight (BLOS) Tactical Digital Information Link (TADIL). S-TADIL J provides for robust continuous connectivity between Navy ships that are beyond JTIDS line-of-sight (LOS) transmission range. The data may comprise position and velocity threat state solution information in addition to discrimination and designation information.

With this tracking data from the second vehicle, the first vehicle is able to provide midcourse guidance to the intercept object even after burnout, increasing its chances of intercept, as represented in block 280. In an embodiment, the midcourse guidance is designed to intercept the threat after burnout but before the threat reaches its apogee. In an embodiment in which the first vehicle is a ship such as an Aegis Combat Ship, the intercept object may be one of the Standard Missile family of weapons that is used to counter ballistic missile threats and midcourse guidance is a known feature. Mid-course guidance may be provided by known methods such as disclosed in U.S. Pat. No. 8,106,340 titled "Generalized Midcourse Missile Guidance," which is fully incorporated by reference in its entirety herein. In this embodiment, the EOR state data received from the "near" ship is used to provide guidance to the interceptor missile during the endo- and exo-atmospheric portions of the interceptor missile's flight. This would include uplinking to the interceptor missile acceleration commands consistent with mid-course guidance as described in U.S. Pat. No. 8,106,340 "Generalized Midcourse Missile Guidance", and also uplinking the EOR state vector to the interceptor missile to support exo-guidance and final target selection at the time of handover to the interceptor missile (time at which the final target state is uplinked to the interceptor missile). This data tells the intercept missile when to use the data to locally acquire the target using its on-board EO/IR sensor package and when to compute the terminal guidance commands on-board the interceptor missile to guide and divert to hit-to-kill the target.

Thus, there has been disclosed a system comprising OPIR sensors and a forward and rearward vehicle. The OPIR sensors are configured to provide early interceptor launch opportunities for the rearward vehicle by providing early detection and measurement data of a launched object and sending sensor measurements to the rearward vehicle from two or more of the sensors as necessary to develop stereo three dimensional track state solutions. The sensor data may be sent by broadcasting a stream of information for receipt by both the forward and rearward vehicles. The rearward vehicle develops boost phase tracking solutions and estimates threat current and future states using position, velocity and acceleration data according to algorithms as discussed herein. The rearward vehicle generates a fire control solution for launch during threat boost, and intercept after threat boost and prior to threat apogee. The rearward ship launches an interceptor and provides in-flight guidance commands. The forward and rearward vehicles are deployed in favorable geometries to provide forward vehicle tracking of a threat using ownship radar. Prior to threat burnout, the forward vehicle, responsive to cue data, acquires and tracks the threat with ownship radar and passes threat state solution data (position/velocity) to the rearward vehicle in addition to discrimination and designation information over a data link such as Link-16 in engage-on-remote (EOR) operations. The rearward ship provides handover data via uplink commands to the in-flight interceptor such as an SM-3 interceptor with updated predicted intercept point data, and the interceptor performs kinetic intercept of the threat after burn out and prior to threat reaching apogee, as is understood by one of ordinary skill in the art.

The features of the missile tracking and intercept system and method have been disclosed, and further variations will be apparent to persons skilled in the art. All such variations are considered to be within the scope of the appended claims. Reference should be made to the appended claims, rather than the foregoing specification, as indicating the true scope of the disclosed invention.

The features of FIGS. 1, 2, and 3 are not exclusive. Other structures may be derived in accordance with the principles of the disclosure to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Any of the functions performed by the embodiments of FIGS. 1, 2, and 3 may be implemented in hardware, software or a combination of both.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system for tracking and engaging a boosting airborne object, the system comprising:
    a plurality of sensors configured to detect and track the boosting airborne object;
    a first vehicle configured to launch and guide an intercept object based on data received from the plurality of sensors;
    a second vehicle configured to receive a cue from the first vehicle or from the plurality of sensors to acquire the track of the boosting airborne object prior to the end of boost and to provide track data after burnout of the airborne object to the first vehicle, thereby enabling the first vehicle to guide the intercept object according to the track data provided by the second vehicle.

2. The system of claim 1, wherein the first vehicle is located farther from a launch point of the boosting airborne object than the second vehicle, thereby providing the first vehicle an increased engagement time to engage the boosting airborne object and thereby providing the second vehicle a better position to acquire track of the boosting airborne object.

3. The system of claim 1, wherein the plurality of sensors comprise overhead persistent infrared sensors configured to detect and track a heat signature of the boosting object.

4. The system of claim 1, wherein the plurality of sensors comprise electro-optical sensors configured to detect and track a light signature of the boosting object.

5. The system of claim 1, wherein at least one of the plurality of sensors is space-based.

6. The system of claim 1, wherein at least one of the plurality of sensors is land-based.

7. The system of claim 1, wherein the first vehicle and second vehicle are ships.

8. The system of claim 1, wherein the first vehicle is land-based or air-based.

9. The system of claim 1, wherein the second vehicle is land-based or air-based.

10. A method for tracking an airborne object, the method comprising the steps of:
   detecting and tracking the airborne object in boost by a plurality of sensors;
   receiving data from the plurality of sensors for the airborne object in boost at a first vehicle;
   launching an intercept object from the first vehicle based on the data;
   receiving at a second vehicle a tracking cue for the airborne object in boost;
   acquiring track of the airborne object by the second vehicle based on the tracking cue;
   tracking the airborne object after burnout by the second vehicle;
   sending tracking data for the airborne object from the second vehicle to the first vehicle; and
   guiding the intercept object to intercept the airborne object by the first vehicle based on the tracking data received from the second vehicle.

11. The method of claim 10, further comprising positioning the first vehicle farther from a launch point of the airborne object than the second vehicle, thereby providing the first vehicle an increased engagement time to engage the boosting airborne object and thereby providing the second vehicle a better position to track the airborne object.

12. The method of claim 10, wherein detecting and tracking an airborne object by a plurality of sensors comprises detecting and tracking a heat signature of the airborne object and wherein receiving data from the plurality of sensors for the airborne object at a first vehicle comprises receiving overhead persistent infrared sensor data.

13. The method of claim 10, wherein detecting and tracking an airborne object by a plurality of sensors comprises detecting and tracking a light signature of the airborne object and wherein receiving data from the plurality of sensors for the airborne object at a first vehicle comprises receiving electro-optical sensor data.

14. The method of claim 10, further comprising processing the data from the plurality of sensors with a first vehicle track solution to obtain first vehicle track solution data for the airborne object.

15. The method of claim 14, further comprising, before launching the intercept object, generating a fire control solution at the first vehicle, based on the first vehicle track solution data, for launching the intercept object so that it intercepts the airborne object before apogee.

16. The method of claim 10, wherein receiving at the second vehicle a tracking cue for the airborne object comprises receiving the first vehicle track solution data from the first vehicle.

17. The method of claim 10, wherein receiving at the second vehicle a tracking cue for the airborne object comprises receiving the data from the plurality of sensors for the airborne object.

18. The method of claim 17, wherein guiding the intercept object to intercept the airborne object by the first vehicle based on the tracking data received from the second vehicle comprises guiding the intercept object by the first vehicle based on the second vehicle tracking solution data.

19. The method of claim 10, wherein tracking the airborne object by the second vehicle comprises tracking the airborne object with a local radar on the second vehicle and processing data from the local radar with a second vehicle tracking solution to obtain second vehicle tracking solution data.

20. The method of claim 19, wherein the second vehicle tracking solution data comprises position, velocity, discrimination, and designation information.

21. The method of claim 10, wherein sending tracking data for the airborne object from the second vehicle to the first vehicle comprises sending the second vehicle tracking solution data from the second vehicle to the first vehicle.

* * * * *